Patented Nov. 19, 1929

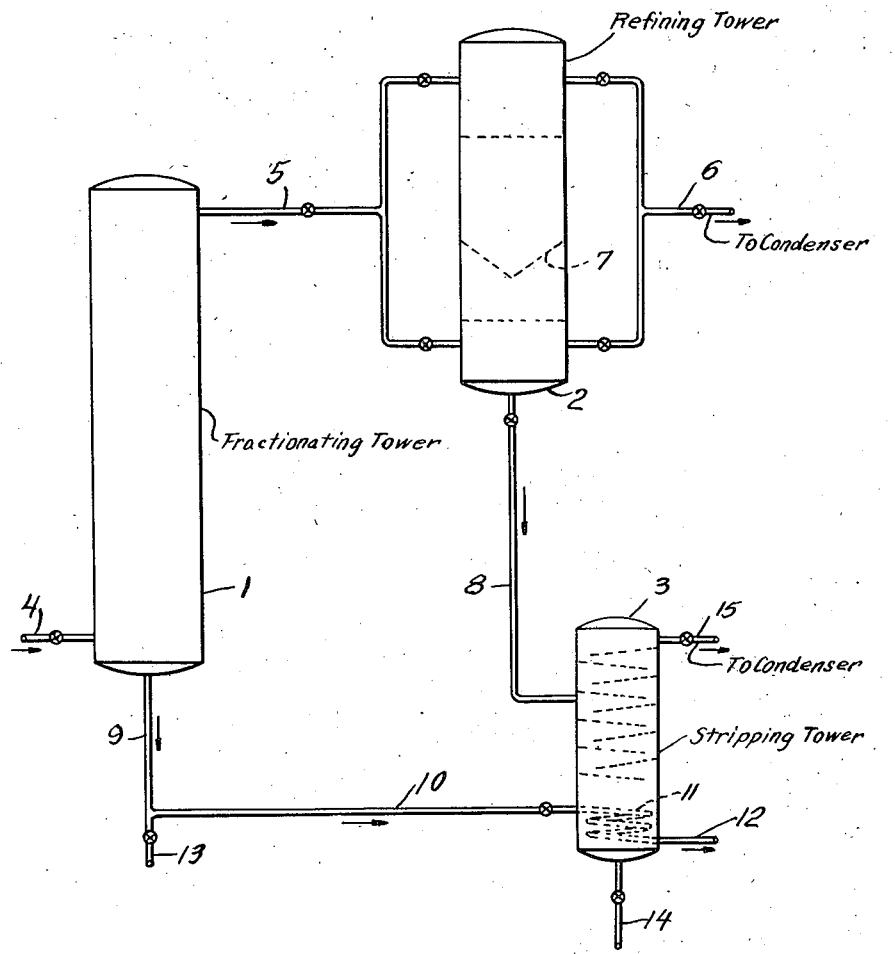

1,736,022

UNITED STATES PATENT OFFICE

THOMAS DE COLON TIFFT, OF CHICAGO, ILLINOIS, AND ARNOLD C. VOBACH, OF WHITING, INDIANA, ASSIGNORS TO SINCLAIR REFINING COMPANY, OF NEW YORK, N. Y., A CORPORATION OF MAINE

ART OF REFINING HYDROCARBONS

Application filed February 10, 1928. Serial No. 253,365.

This invention relates to improvements in the vapor phase refining of hydrocarbons and hydrocarbon mixtures.

When hydrocarbon vapors including certain types of unsaturated compounds, for example the di-olefines, are passed in contact with fuller's earth or similar adsorptive catalysts, a polymerization of these unsaturated compounds takes place with resulting formation of polymers of boiling point higher than that of the original compound. This makes possible a separation of such constituents, undesirable as components of the refined product, without separation of other unsaturated constituents suitable as components of such products, and the several advantages of this general method or refining hydrocarbon vapors have made it of considerable practical importance, in the refining of motor fuel gasoline in particular. As applied to gasoline, this general method makes possible the removal of constituents rendering the product unstable, of bad color or bad odor without removal of unsaturated constituents of special value in the product, such as those which have anti-knock properties.

In carrying out this general method, the hydrocarbon vapors to be refined are usually passed through a charge of the adsorptive catalyst in a suitable receptacle where polymerization and liquefaction of undesirable unsaturated constituents is affected, the liquefied polymers and other higher boiling products of the refining operation being discharged separately from the refined hydrocarbon vapors. This liquefied material has a certain solvent capacity and as a consequence has a tendency to carry with it dissolved constituents suitable as components of the desired product. Further with the apparatus usually employed this liquefied material carries with it entrained constituents suitable as components of the desired product. This invention relates particularly to improvements in the recovery of such dissolved or entrained constituents suitable as components of the desired products from the liquefied polymers and any other higher boiling condensate produced in this type of refining operation.

Before the hydrocarbon vapors to be refined are passed in contact with the adsorptive catalyst, in carrying out this type of operation, it is also common practice to subject the hydrocarbon vapors to some fractionating operation for a separation of higher boiling constituents, constituents higher boiling than suitable as components of the desired product and constituents not necessary to be subjected to the refining operation. Such fractionating operations separate the vapor mixture supplied thereto into a higher boiling condensate and a remaining vapor mixture freed from such condensed constituents which is subjected to the refining operation. This condensate may be returned to a distilling operation or to a cracking operation with which the fractionating apparatus is connected or it may be cooled and run to storage.

According to the present invention, the unrefined hydrocarbon vapor mixture is passed first through a fractionating operation in which a higher boiling condensate is separated, the remaining vapor mixture is then passed in contact with a charge of the adsorptive catalyst, the liquefied polymers and other higher boiling material produced in this refining operation are subjected to a stripping operation in which they are reheated by heat exchange with the condensate from the fractionating operation to which the vapor mixture is first subjected, any dissolved or entrained lower boiling constituents are vaporized in this stripping operation by this heat exchange and are separately recovered, and the liquefied polymers and any other higher boiling material are discharged from the stripping operation freed from such dissolved or entrained lower boiling constituents. It will be apparent that this separation of lower boiling constituents from the higher boiling liquefied material produced in the refining operation is effected, in carrying out the present invention, in a particularly advantageous manner.

The invention will be further described in connection with the accompanying drawings which illustrate, diagrammatically and conventionally, in elevation, apparatus adapted for carrying out the invention, but it is intended and will be understood that this more detailed description and illustration of the invention is by way of exemplification.

The apparatus illustrated comprises a fractionating tower 1, a refining tower 2 and a stripping tower 3. The crude hydrocarbon vapor mixture is supplied to the lower end of the fractionating tower through connection 4, the hydrocarbon vapors escaping uncondensed therefrom pass to the refining tower through connection 5 and the refined hydrocarbon vapors escape from the refining tower through a connection 6 to a condenser or other suitable recovery apparatus. The hydrocarbon vapors may be passed upwardly or downwardly through the refining tower 2, and the branch connections illustrated between the refining tower and connections 5 and 6 are provided to permit operation in either way. A charge of the adsorptive catalyst, for example, fuller's earth 40–60 or 60–80 mesh, is supported upon a foraminous partition 7 in the tower adapted to retain the adsorptive catalyst but to permit free passage of vapors. The liquefied polymers and higher boiling material condensed in the refining tower 2 are discharged through connection 8 into the stripping tower 3. Condensate from the fractionating tower 1 is supplied through connections 9 and 10 to a heating coil 11 arranged in the lower end of the stripping tower 3, this condensate being discharged from this heating coil through connection 12. Part of the condensate from the fractionating tower 1 may be discharged through connection 13, and the heating of the stripping tower may be controlled by regulating the proportion of condensate so discharged. Connection 14 is provided for the discharge of higher boiling material from the lower end of stripping tower 3 and connection 15 is provided for the discharge from the stripping tower 3 of lower boiling constituents vaporized therein. Such vaporized constituents are discharged through this connection to a condenser or other suitable recovery apparatus. To promote effective separation of higher boiling and lower boiling constituents in the separating tower, it may be provided with a number of baffles, as illustrated, and the liquefied polymers and higher boiling condensate from the refining tower introduced at an intermediate point along this series of baffles. The vapors passing through the fractionating tower may be cooled and the fractionating operation controlled in any convenient manner.

In carrying out the invention in the apparatus illustrated, the hydrocarbon vapors from which higher boiling constituents have been separated as a condensate in the fractionating operation carried out in tower 1 are passed through a charge of the adsorptive catalyst in tower 2 where further constituents of the hydrocarbon vapors are condensed or polymerized and the polymers condensed. This liquefied material is then stripped of any entrained or dissolved lower boiling constituents in the stripping tower 3 by heat exchange with condensate from the fractionating tower 1. The discharge of liquefied material from the refining tower 2 may be regulated, for example, to maintain a definite liquid level in the lower end of the refining tower. Advantageously, a sufficient body of such liquefied material is maintained in the lower end of the stripping tower 3 to submerge the heating coil 11, in order to promote effective heat exchange between the material discharged from the refining operation to the stripping operation and the condensate discharged from the fractionating operation. The discharge of the remaining higher boiling material from the stripping operation may similarly, for example, be regulated to maintain a definite liquid level.

This invention is of special value as applied to vapor phase refining operations where the hydrocarbon vapors to be refined are passed in contact with an adsorptive catalyst used in conjunction with cracking operations where the liquefied material produced in the refining operation is returned to the cracking operation. The return to the cracking operation of lower boiling constituents suitable as components of the desired product dissolved or entrained in this liquefied material tends to involve unnecessary loss in the further cracking and over-cracking of such lower boiling constituents. This invention provides a particularly advantageous method for the separation of such lower boiling constituents from the liquefied material produced in the refining operation where this liquefied material is to be returned to some associated cracking operation.

We claim:

1. In the vapor phase refining of hydrocarbons by passage of the hydrocarbon vapors through a charge of an adsorptive catalyst, the improvement which comprises subjecting the hydrocarbon vapors first to a fractionating operation and therein condensing higher boiling constituents from the hydrocarbon vapors, subjecting the remaining hydrocarbon vapors to a refining operation by passing them as vapors in contact with an adsorptive catalyst, condensing vapors escaping uncondensed from the refining operation, separately discharging liquefied higher boiling material produced in the refining operation therefrom, and stripping lower boiling constituents from this higher boiling material by heat exchange with condensate discharged from the fractionating operation first mentioned.

2. In the vapor phase refining of hydrocarbons by passage of the hydrocarbon vapors through a charge of an adsorptive catalyst, the improvement which comprises subjecting the hydrocarbon vapors first to a fractionating operation and therein condensing higher boiling constituents from the hydrocarbon vapors, subjecting the remaining hydrocarbon vapors to a refining operation by passing them in contact with an adsorptive catalyst, discharging the liquefied higher boiling materials produced in the refining operation therefrom, and stripping lower boiling constituents from this higher boiling material by indirect heat exchange with condensate from the fractionating operation first mentioned.

3. In the vapor phase refining of hydrocarbons by passage of the hydrocarbon vapors through a charge of an adsorptive catalyst, the improvement which comprises subjecting the hydrocarbon vapors first to a fractionating operation and therein condensing higher boiling constituents from the hydrocarbon vapors, subjecting the remaining hydrocarbon vapors to a refining operation by passing them in contact with an adsorptive catalyst, condensing vapors escaping uncondensed from the refining operation, discharging liquefied higher boiling material produced in the refining operation therefrom, stripping lower boiling constituents from this higher boiling material by heat exchange with condensate from the fractionating operation first mentioned, and separately condensing the lower boiling constituents from the stripping operation.

In witness whereof, we have subscribed our names.

THOMAS DE COLON TIFFT.
ARNOLD C. VOBACH.